US011527955B2

(12) United States Patent
Li et al.

(10) Patent No.: US 11,527,955 B2
(45) Date of Patent: Dec. 13, 2022

(54) SYSTEMS, METHODS AND DEVICES FOR CONTROL OF DC/DC CONVERTERS AND A STANDALONE DC MICROGRID USING ARTIFICIAL NEURAL NETWORKS

(71) Applicant: THE BOARD OF TRUSTEES OF THE UNIVERSITY OF ALABAMA, Tuscaloosa, AL (US)

(72) Inventors: Shuhui Li, Northport, AL (US); Xingang Fu, Kingsville, TX (US); Weizhen Dong, Tuscaloosa, AL (US)

(73) Assignee: THE BOARD OF TRUSTEES OF THE UNIVERSITY OF ALABAMA, Tuscaloosa, AL (US)

( * ) Notice: Subject to any disclaimer, the term of this patent is extended or adjusted under 35 U.S.C. 154(b) by 961 days.

(21) Appl. No.: 16/287,490

(22) Filed: Feb. 27, 2019

(65) Prior Publication Data
US 2019/0296643 A1     Sep. 26, 2019

Related U.S. Application Data

(60) Provisional application No. 62/648,039, filed on Mar. 26, 2018.

(51) Int. Cl.
*H02M 3/158* (2006.01)
*G06N 3/02* (2006.01)
(Continued)

(52) U.S. Cl.
CPC .............. *H02M 3/158* (2013.01); *G06N 3/02* (2013.01); *G06N 3/0445* (2013.01); *G06N 3/08* (2013.01);
(Continued)

(58) Field of Classification Search
CPC .......................... H02M 3/1582; H02M 3/158
See application file for complete search history.

(56) References Cited

U.S. PATENT DOCUMENTS

9,379,546 B2    6/2016  Li
2016/0329714 A1*  11/2016  Li ..................... H02M 7/537

OTHER PUBLICATIONS

Farhangi, The path of the smart grid, IEEE Power and Energy Magazine, vol. 8, No. 1, pp. 18-28, 2010.
(Continued)

*Primary Examiner* — Olisa Anwah
(74) *Attorney, Agent, or Firm* — Meunier Carlin & Curfman LLC

(57) ABSTRACT

An example method for controlling a DC/DC converter or a standalone DC microgrid comprises an artificial neural network (ANN) based control method integrated with droop control. The ANN is trained to implement optimal control based on approximate dynamic programming. In one example, Levenberg-Marquardt (LM) algorithm is used to train the ANN, where the Jacobian matrix needed by LM algorithm is calculated via a Forward Accumulation Through Time algorithm. The ANN performance is evaluated by using power converter average and switching models. Performance evaluation shows that a well-trained ANN controller has a strong ability to maintain voltage stability of a standalone DC microgrid and manage the power sharing among the parallel distributed generation units. Even in dynamic and power converter switching environments, the ANN controller shows an ability to trace rapidly changing reference commands and tolerate system disturbances, and operate the DC/DC converter or the microgrid in standalone conditions.

6 Claims, 13 Drawing Sheets

(51) Int. Cl.
*G06N 3/04* (2006.01)
*G06N 3/08* (2006.01)
*H02J 1/10* (2006.01)
*H02M 1/00* (2006.01)

(52) U.S. Cl.
CPC .......... *H02J 1/102* (2013.01); *H02M 3/1582* (2013.01); *H02M 1/0012* (2021.05)

(56) References Cited

OTHER PUBLICATIONS

K. Kurohane, T. Senjyu, A. Yona, N. Urasaki, T. Goya and T. Funabashi, "A Hybrid Smart AC/DC Power System," in IEEE Transactions on Smart Grid, vol. 1, No. 2, pp. 199-204, Sep. 2010.
H. Han, X. Hou, J. Yang, J. Wu, M. Su and J. M. Guerrero, "Review of Power Sharing Control Strategies for Islanding Operation of AC Microgrids," in IEEE Transactions on Smart Grid, vol. 7, No. 1, pp. 200-215, Jan. 2016.
A. Kahrobaeian and Y. A. R. I. Mohamed, "Interactive Distributed Generation Interface for Flexible Micro-Grid Operation in Smart Distribution Systems," IEEE Trans. Sust. Energy, vol. 3, No. 2, pp. 295-305, Apr. 2012.
A. Mehrizi-Sani and R. Iravani, "Potential-Function Based Control of a Microgrid in Islanded and Grid-Connected Modes," IEEE Trans. Power Syst., vol. 25, No. 4, pp. 1883-1891, Nov. 2010.
T. Dragicevic, J. C. Vasquez, J. M. Guerrero and D. Skrlec, "Advanced LVDC Electrical Power Architectures and Microgrids: A step toward a new generation of power distribution networks.," IEEE Electrification Magazine, vol. 2, No. 1, pp. 54-65, Mar. 2014.
Justo, J.J., Mwasilu, F., Lee, J. and Jung, J.W., "AC-microgrids versus DC-microgrids with distributed energy resources: A review," Renewable and Sustainable Energy Reviews, 24, pp. 387-405, 2013.
U. Manandhar, A. Ukil and T. K. K. Jonathan, "Efficiency comparison of DC and AC microgrid," Smart Grid Technologies—Asia (ISGT Asia), 2015 IFEE Innovative, Bangkok, 2015, pp. 1-6.
H. Lotfi; A. Khodaei, "AC Versus DC Microgrid Planning," in IEEE Transactions on Smart Grid, vol. PP, No. 99, pp. 1-9.
J. M. Guerrero, J. C. Vasquez, J. Matas, L. G. de Vicuna and M. Castilla, "Hierarchical Control of Droop-Controlled AC and DC Microgrids—A General Approach Toward Standardization," in IEEE Transactions on Industrial Electronics, vol. 58, No. 1, 6 pages, 2009.
H. Kakigano, Y. Miura, T. Ise and R. Uchida, "DC micro-grid for super high-quality distribution—System configuration and control of distributed generations and energy storage devices," 2006 37th IEEE Power Electronics Specialists Conference, Jeju, 2006, pp. 1-7.
J. Schonbergerschonberger, R. Duke and S. D. Round, "DC-Bus Signaling: A Distributed Control Strategy for a Hybrid Renewable Nanogrid," in IEEE Transactions on Industrial Electronics, vol. 53, No. 5, pp. 1453-1460, Oct. 2006.
S. Li, M. Fairbank, C. Johnson, D.C. Wunsch and E. Alonso, "Artificial Neural Networks for Control of a Grid-Connected Rectifier/Inverter under Disturbance, Dynamic and Power Converter Switching Conditions," IEEE Trans. Neural Netw. Learn. Syst., vol. 25, No. 4, pp. 738-750, Apr. 2014.
F.Y. Wang, H. Zhang, and D. Liu, "Adaptive dynamic programming: An introduction," IEEE Comput. Intell. Mag., pp. 39-47, 2009.
X. Fu, S. Li, M. Fairbank, D. C. Wunsch, and E. Alonso, "Training recurrent neural networks with the Levenberg-Marquardt algorithm for optimal control of a grid connected converter," IEEE Trans. Neural Netw. Learn. Syst., 26(9), pp. 1900-1912 Oct. 2014.
S. Anand, B. G. Fernandes and J. Guerrero, "Distributed Control to Ensure Proportional Load Sharing and Improve Voltage Regulation in Low-Voltage DC Microgrids," in IEEE Transactions on Power Electronics, vol. 28, No. 4, pp. 1900-1913, Apr. 2013.

* cited by examiner

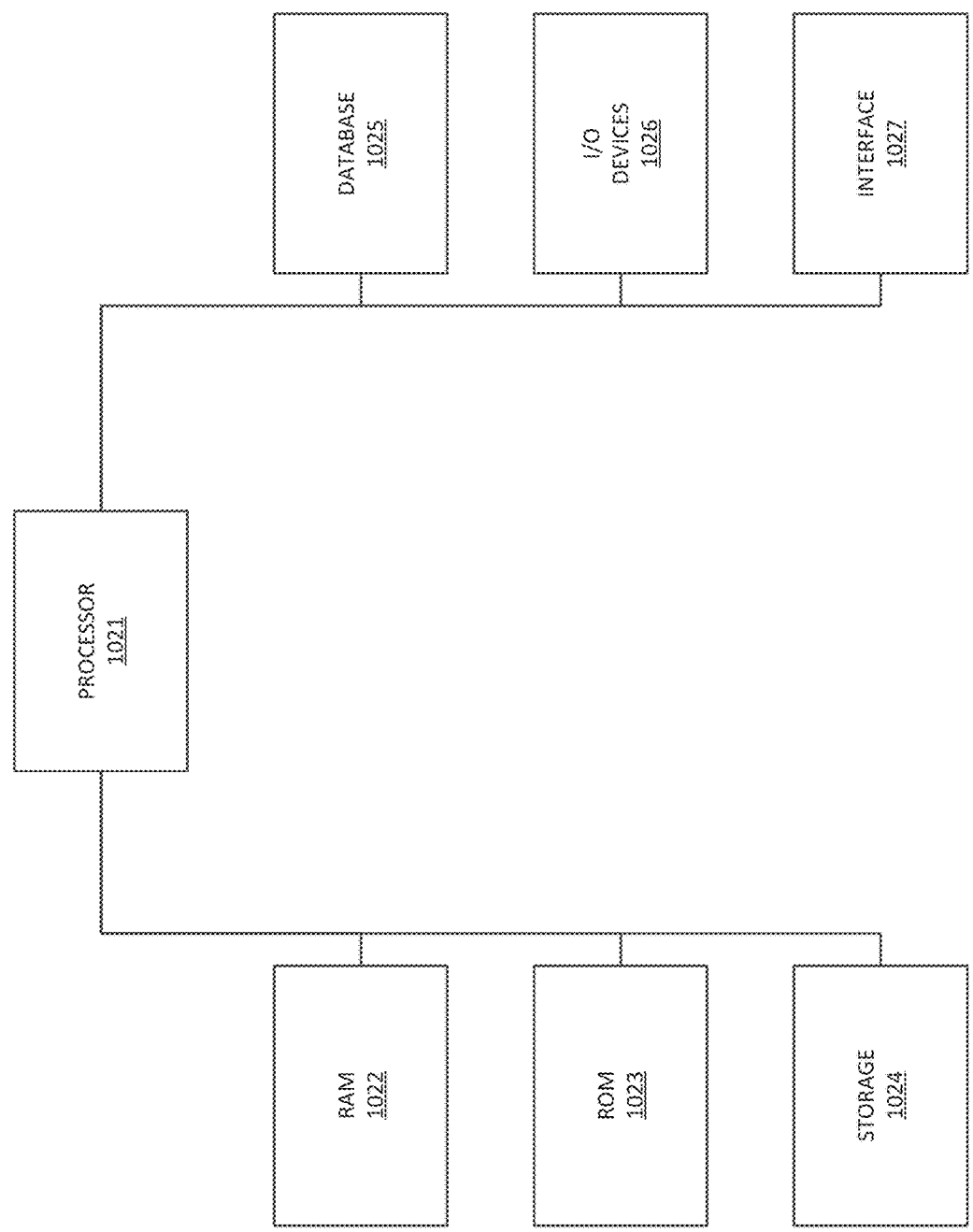

SYSTEMS, METHODS AND DEVICES FOR CONTROL OF DC/DC CONVERTERS AND A STANDALONE DC MICROGRID USING ARTIFICIAL NEURAL NETWORKS

CROSS-REFERENCE TO RELATED APPLICATION

This application claims priority to and benefit of U.S. provisional patent application Ser. No. 62/648,039 filed Mar. 26, 2018, which is fully incorporated by reference and made a part hereof.

BACKGROUND

Microgrids (MGs) are becoming an important concept to integrate Distributed Generation (DG) and Energy Storage Systems (ESSs). Microgrids are generally categorized into two types: AC microgrids and DC microgrids. AC microgrids have been studied and implemented by many researchers. Recently, DC microgrids also start to draw a wide attention for many reasons, such less energy conversion, lower losses, and controllability. In particular, some generations and loads are inherently DC, such as solar photovoltaic (PV), battery, electrical vehicle (EV), etc., where a DC microgrid would integrate them more naturally and improve system efficiency and reliability.

A DC microgrid, such as the one shown in FIG. 1, is capable of operating in grid-tied and standalone modes. In the grid-tied mode, a DC microgrid is connected to the main grid via one or more DC/AC inverters 102 and the power deficit of the DC microgrid can be supplied by the main grid and excess power generated in the microgrid can be traded with the main grid. In the standalone mode (the microgrid is disconnected from the main grid by, for example, switch 104), it is necessary to establish the bus voltages and at the same time provide the demanded active powers of loads. One of the more common methods for DC microgrid operation in standalone mode is the droop method, which usually integrates with voltage control of DC/DC converters to maintain MG voltage stability and provide power sharing control among parallel distributed generation (DG) units.

Recently, an artificial neural network (ANN) control strategy has been developed for control of voltage source DC/AC converters in different applications, including control of inverters in AC microgrids (see, for example, U.S. Pat. No. 9,379,546 and US Patent Application Publication No. 2016/0329714, both of which are fully incorporated by reference and made a part hereof). The ANN control has shown a very fast response time and a close to ideal controller performance. It has a potential to improve frequency and voltage stability of an AC microgrid, enhance power quality, and assure fast synchronization and transition between grid-tied and islanded operating conditions of an AC microgrid. However, until now no known research has been done to develop ANN-based control for DC/DC converters and apply ANNs to control DC microgrids.

Furthermore, in electric power/energy system and renewable energy system applications, a DC/DC power converter is usually employed. Non-limiting examples of the application of such DC/DC converters 106 are shown in FIG. 1. Typical applications containing DC/DC power converters include DC/DC converter for solar, battery and fuel cell applications; DC/DC converter in transportation such as electric vehicles; DC/DC converter for communications and data centers; etc.

Therefore, what is desired are systems, methods and devices for ANN-based control for DC/DC converters and integration of such systems, methods and devices with droop mechanism for control of a standalone DC microgrid

SUMMARY

Methods, systems and devices are described herein that use artificial neural networks to control DC/DC converters and integrate ANN control with droop mechanism for control of a standalone DC microgrid.

It should be understood that the above-described subject matter may also be implemented as a computer-controlled apparatus, a computer process, a computing system, or an article of manufacture, such as a computer-readable storage medium.

Other systems, methods, features and/or advantages will be or may become apparent to one with skill in the art upon examination of the following drawings and detailed description. It is intended that all such additional systems, methods, features and/or advantages be included within this description and be protected by the accompanying claims.

BRIEF DESCRIPTION OF THE DRAWINGS

The components in the drawings are not necessarily to scale relative to each other. Like reference numerals designate corresponding parts throughout the several views.

FIG. 10 illustrates ANN vs. PI control under.

FIG. 11 illustrates ANN vs. PI control under: FIG. 12 illustrates an exemplary computer that can be used for controlling a DC/DC converter and/or a standalone DC microgrid.

DETAILED DESCRIPTION

Unless defined otherwise, all technical and scientific terms used herein have the same meaning as commonly understood by one of ordinary skill in the art. Methods and materials similar or equivalent to those described herein can be used in the practice or testing of the present disclosure. As used in the specification, and in the appended claims, the singular forms "a," "an," "the" include plural referents unless the context clearly dictates otherwise. The term "comprising" and variations thereof as used herein is used synonymously with the term "including" and variations thereof and are open, non-limiting terms. The terms "optional" or "optionally" used herein mean that the subsequently described feature, event or circumstance may or may not occur, and that the description includes instances where said feature, event or circumstance occurs and instances where it does not. While implementations will be described for controlling DC/DC Buck converters, it will become evident to those skilled in the art that the implementations are not limited thereto, but are applicable for controlling other types of DC/DC converters, including but not limited to, DC/DC boost converter, DC/DC buck/boost converter.

Figure 1:
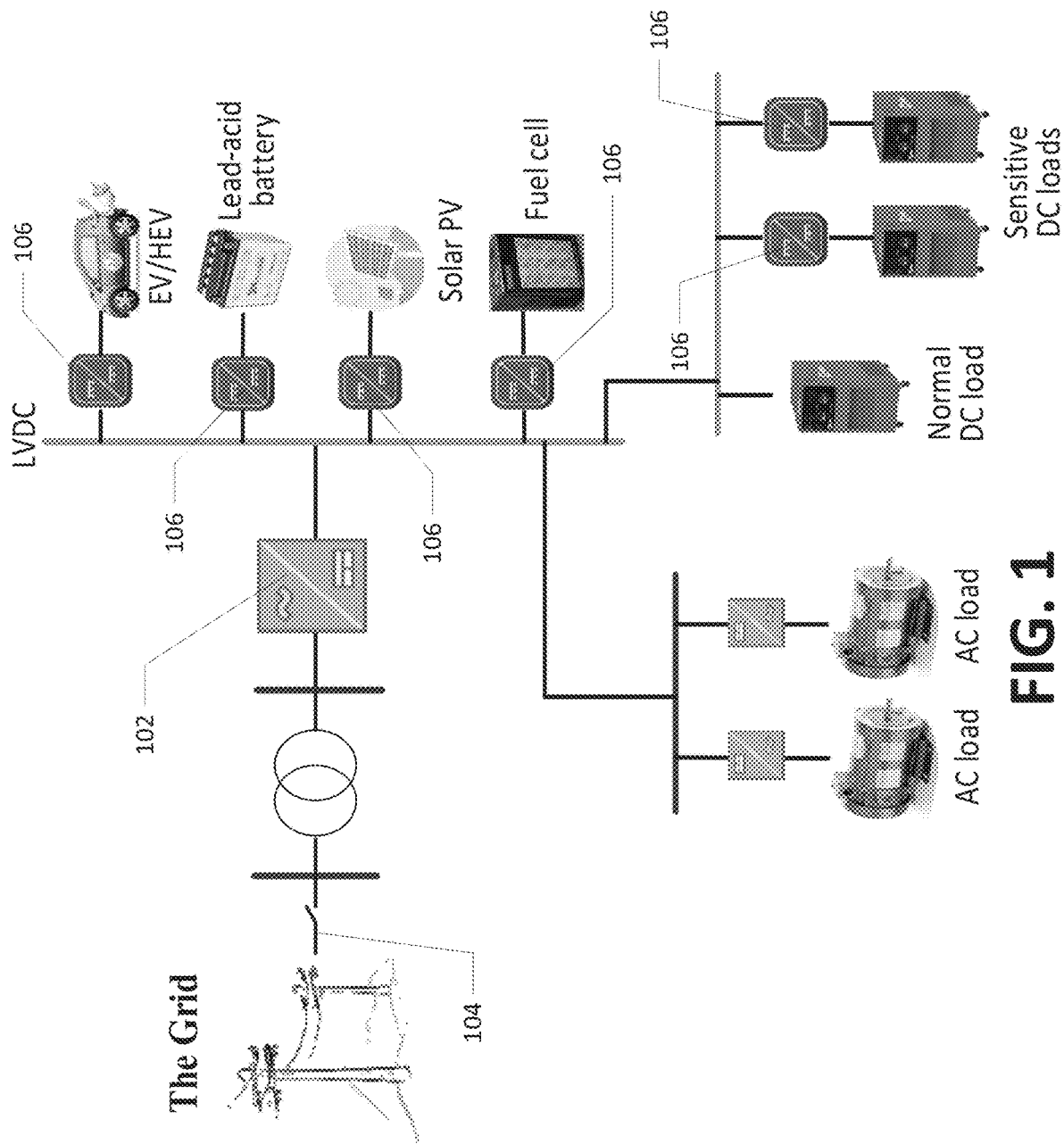
FIG. 1 is an illustration of a configuration of an exemplary DC microgrid.

Referring now to FIG. 1, a configuration of a typical DC MG is shown. The microgrid is connected to the AC main grid through a bidirectional DC/AC converter 102 and a switch 104. DG sources within the MG may include PV arrays, fuel cells, EVs, battery storage, and the like, each of which is connected to a DC bus through a DC/DC converter 106. At various times, the DG sources may either generate power, or absorb it. For example, the PV array and fuel cell powers are always generating and unidirectional from the PV array or fuel cell to the DC bus while the EV and battery power can be generating or absorbing. Normally, the PV array operates in maximum power point tracking (MPPT) mode, and thus its power is not controllable. However, the power of the EV and battery can be regulated to maintain power balance and voltage stability of the DC microgrid, especially in standalone mode. Loads in the DC microgrid may include normal DC loads directly connected to DC network; sensitive DC loads, each of which is connected to the DC network through a DC/DC converter; AC loads connected to the DC system through inverters; and the like. When the switch 104 is closed, the DC system works in the grid-tied mode. When the switch 104 is open, the DC system works as a standalone condition, in which control of the DC generation sources is desired in order to maintain the voltage stability of system and sharing of the load power among the generation sources.

Figure 2:
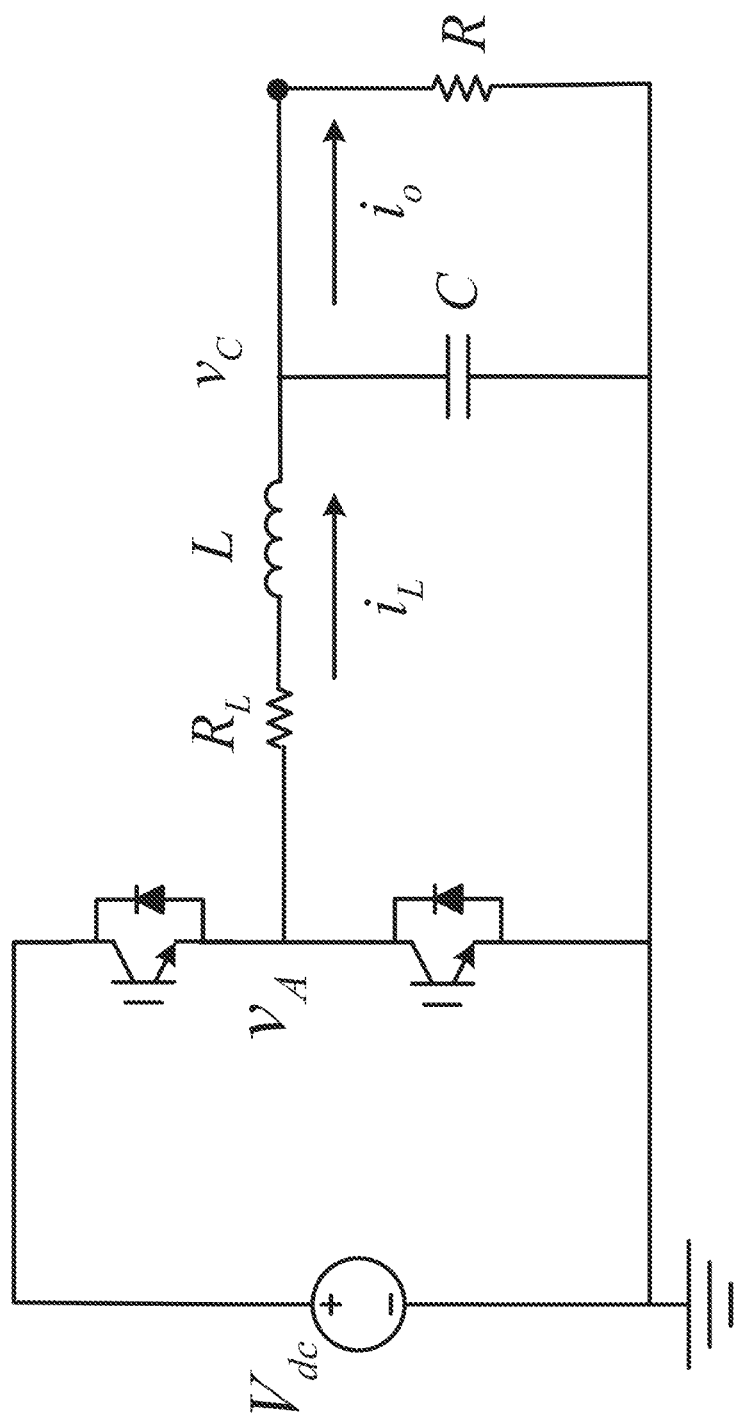
FIG. 2 is an illustration of an exemplary standalone DC/DC converter with loads.

FIG. 2 is an illustration of a standalone DC/DC converter with loads. In a DC microgrid in the standalone condition, a DC source and a DC load which are connected together via a DC/DC converter such as the one shown in FIG. 2. The control objective of the DC/DC converter is to maintain voltage stability of the loads and provide proper power sharing of DG units. To develop an ANN controller, the model of the system shown by FIG. 2 is used. Using a power converter average model and the generator sign convention, the voltage and current balance equations across the smoothing inductor and capacitor of the DC/DC converter are:

$$v_A = R_L i_L + L\frac{di_L}{dt} + v_c \tag{1a}$$

$$C\frac{dv_c}{dt} = i_L + \frac{v_c}{R} \tag{1b}$$

where $R_L$ and L are the resistance and inductance of the smoothing inductor, C is the capacitance of the smoothing capacitor, $v_A$ is output voltage of the DC/DC converter, $v_C$ is the capacitor or the voltage at DC point of common coupling (PCC), $i_L$ is current flowing through the smoothing inductor, and R represents load resistance.

In the standalone case, the control objective of the DC/DC converter is to maintain the voltage stability of the loads and, at the same time, provide power sharing through integrating voltage control with droop control, as shown herein.

The ANN controller is developed based on the state-space model of the DC/DC converter, by rearranging (1) into the standard state-space form, as shown by:

$$\frac{d}{dt}\begin{pmatrix} i_L \\ v_c \end{pmatrix} = -\begin{pmatrix} R_L/L & -1/L \\ 1/C & -1/RC \end{pmatrix}\begin{pmatrix} i_L \\ v_c \end{pmatrix} + \begin{pmatrix} v_A/L \\ 0 \end{pmatrix} \tag{2}$$

where the system states are $i_L$ and $v_c$. The converter output voltages $v_A$ is proportional to the control voltage generated by the ANN controller.

As the ANN controller is a digital controller, a discrete model of the continuous state-space model is needed. This is obtained through a zero- or first-order hold discrete equivalent mechanism. This transformation yields:

$$\begin{pmatrix} i_L(kT_s + T_s) \\ v_c(kT_s + T_s) \end{pmatrix} = A\begin{pmatrix} i_L(kT_s) \\ v_c(kT_s) \end{pmatrix} + B\begin{pmatrix} v_A(kT_s) \\ 0 \end{pmatrix} \tag{3}$$

in which $T_s$ represents the sampling time, A is the system matrix, and B is the input matrix. Since $T_s$ is present on both sides, (3) can be simplified as:

$$\begin{pmatrix} i_L(k+1) \\ v_c(k+1) \end{pmatrix} = A\begin{pmatrix} i_L(k) \\ v_c(k) \end{pmatrix} + B\begin{pmatrix} v_A(k) \\ 0 \end{pmatrix}, \tag{4}$$

where k is an integer time step.

Figure 3:
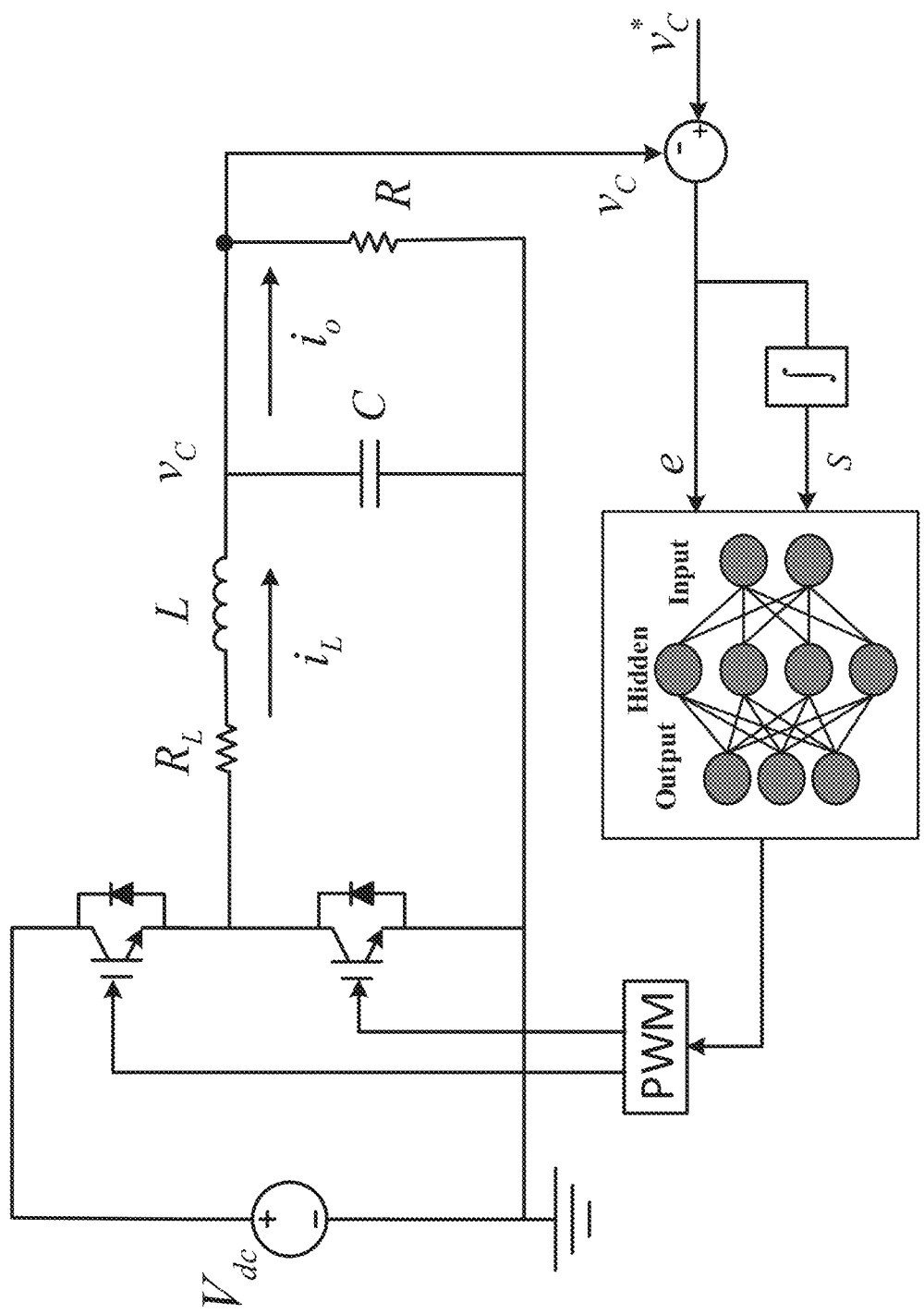
FIG. 3 is a schematic diagram illustrating an exemplary ANN controller for a standalone DC/DC converter with loads.

One non-limiting example of the structure of an ANN controller 302 is shown in FIG. 3. In this example, The ANN is comprised of four different layers: an input layer, two hidden layers, and an output layer. The input layer contains two inputs: the error term and the integral of the error term as defined by:

$$e_{v_c}(k) = v_c(k) - v_c^*(k), s_{v_c}(k) = \int_0^k e_{v_c}(t)dt, \tag{5}$$

where $v^*_c(k)$ is the reference PCC voltage. As shown by (5), the ANN has the same input signals of error terms and integrals of error terms as those used in a traditional proportional-integral (PI) controller. Hence, the ANN controller can be considered as a "super-PI" controller. The two inputs are divided by their appropriate gains, and then processed through a hyperbolic tangent function. The input layer then feeds into the hidden layers. Each node at the hidden layers uses a hyperbolic-tangent activation function. Finally, the output layer gives $v^*_A(k)$, the output of the ANN. This output is multiplied by a gain, $k_{PWM}$, which represents the pulse-width-modulation (PWM) gain, to obtain the final control action applied to the DC/DC converter, $v_A$, given by:

$$v_A(k) = k_{PWM} \cdot A\left(e_{v_c}(k), s_{v_c}(k), \vec{w}\right), \tag{6}$$

where $w^r$ represents the network's overall weight vector, and A(*) denotes the whole ANN action network.

The ANN controller is trained to achieve optimal control based on approximate dynamic programming (ADP). The ADP cost-to-go function used herein is:

$$C(v_c) = \sum_{k=1}^{N}[v_c(k) - v_c^*(k)]^2 \quad (7)$$

To achieve ADP-based optimal control, the cost-to-go function (7) needs to be minimized through training the ANN. In the closed-loop control environment, the ANN has the recurrent network nature as the output of the DC/DC converter serves as a feedback to the input of the network at the next time step. For training the recurrent network, the gradient of (7) with respect to the weight vector $\partial C/\partial w^r$ is calculated through the chain rule. The calculation starts from (7) and passes through (3), (6) and (5), and then feeds these derivatives into the next time step's ANN inputs, via the chain-rule. In one example, the Levenberg-Marquardt (LM) algorithm was used to train the network, and the Jacobian matrix needed by LM algorithm was calculated via a Forward Accumulation Through Time (FATT) algorithm. A more detailed description about training the recurrent neural network using LM and FATT algorithms is available in X. Fu, S. Li, M. Fairbank, D. C. Wunsch, and E. Alonso, "Training recurrent neural networks with the Levenberg-Marquardt algorithm for optimal control of a grid connected converter," *IEEE Trans. Neural Netw. Learn. Syst.*, October 2014, which is fully incorporated by reference. After that, the adjustment of network weights $\Delta w^u$ for a training epoch can be obtained, and the network weights are updated by $$\overset{u}{w}_{update} = \overset{u}{w} + \Delta\overset{u}{w} \quad (8)$$

This process is continued until a stop criterion is reached. The goal of the training is to minimize the ADP cost-to-go (7) by repeatedly adjusting the network weights. After successful training, the ANN is able to implement optimal PCC voltage control based on ADP, i.e., to make the actual PCC voltage track the reference voltage as closely as possible.

Droop Control Method for DC DG Units

Figure 4:
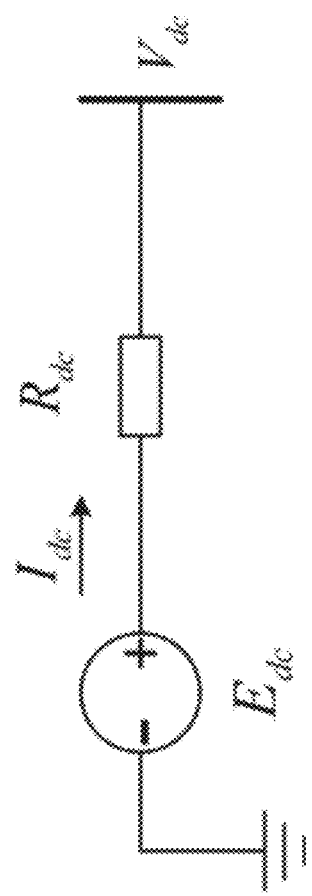
FIG. 4 is a simplified schematic diagram illustrating a DC DG unit connected to a DC bus.

In practice, a DC DG unit such as those shown in FIG. 1 is usually connected to a DC bus through a transmission line with resistance $R_{dc}$ as shown by FIG. 4. The power $P_{dc}$ delivering to the bus from the DG equals:

$$P_{dc} = E_{dc}I_{dc} \quad (9)$$

where $E_{dc}$ is the converter output voltage or voltage at the smoothing capacitor of the DC/DC converter and $I_{dc}$ is the current flowing through the transmission line from the DG unit to the bus, which is given by:

$$i_{dc} = (E_{dc} - V_{dc})/R_{dc} \quad (10)$$

where $V_{dc}$ is the common bus voltage and $R_{dc}$ is the DC line resistance.

Figure 5:
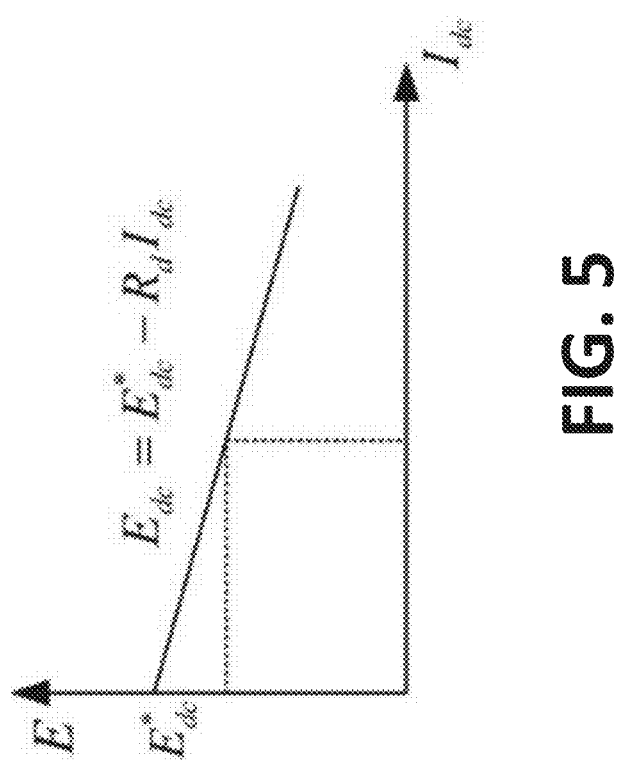
FIG. 5 is a graph illustrating a DC droop control method.

From (9) and (10), it is shown that the output power of a DG is dependent on the difference between the output voltage of the DC converter and the common bus voltage. The governing equation of the DC droop method is expressed as:

$$E_{dc} = E^*_{dc} - R_d P_{dc} \quad (11)$$

where $E^*_{dc}$ is the reference inverter output voltage, and $R_d$ is called droop coefficient. Eq. (11) is depicted graphically in FIG. 5. In general, as the power output of the DG increases, its output voltage drops.

Figure 6A:
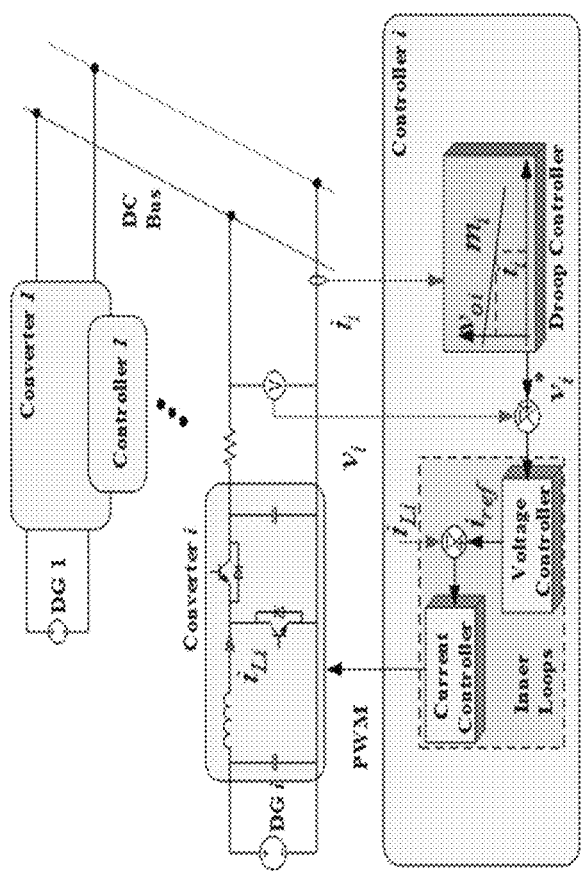
FIG. 6A is a schematic illustrating two or more DG units, having equal capacity, connected to a common bus.
Figure 6B:
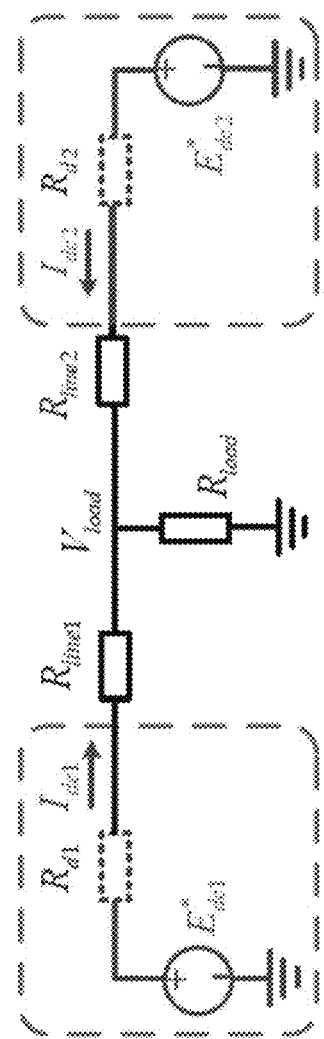
FIG. 6B is a simplified schematic illustrating two DG units connected to a common bus.

If two or more DG units, having equal capacity, are connected to a common bus (see, for example, FIG. 6A), it is generally desired that power should be shared equally between these units. For two DC converter units connected to a common bus through different line resistances (FIG. 6B), the following according to the droop characteristics can be derived:

$$V_{load} = \begin{cases} E^*_{dc} - R_{d1}I_{dc1} - R_{line1}I_{dc1} \\ E^*_{dc} - R_{d2}I_{dc2} - R_{line2}I_{dc2} \end{cases} \quad (12)$$

Then, it can be obtained:

$$\frac{I_{dc1}}{I_{dc2}} = \frac{R_{d1}}{R_{d2}} + \frac{R_{line2} - R_{line1}R_{d2}/R_{d1}}{R_{d1} + R_{line1}} \quad (13)$$

which shows that the current sharing error between the two DC converters cannot be eliminated unless (14), below, is satisfied in designing the droop coefficient of each DG unit. This is the virtual resistance issue and needs to be considered in the integrated ANN and droop control design.

$$R_{d1}/R_{d2} = R_{line1}/R_{line2}. \quad (14)$$

Figure 7:
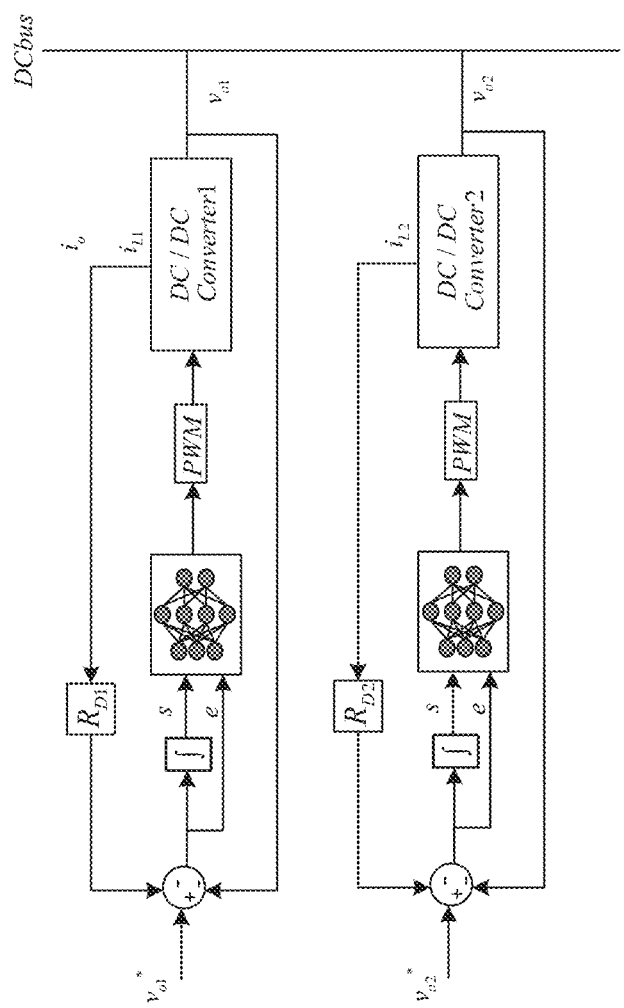
FIG. 7 is a schematic illustrating droop, virtual resistance and ANN control integration for two DC/DC converters.

The integration of droop and ANN controllers is based on the DC microgrid system shown by FIG. 1. Basically, for each DG unit, the droop controller is responsible for the power sharing management among parallel DG units while the ANN controller is responsible for regulating the output voltage of the DC/DC converter according to the reference voltage generated by the droop controller (FIG. 7).

The design of the droop controller of each DG unit considered the power sharing requirement based on the capacity of each unit, and then the virtual resistance was included to assure that the condition of (14) is satisfied. The droop controller together with the virtual impedance generates a voltage reference which is sent to the ANN controller.

An ANN controller must be trained before applying it to the overall system. The training was based on the independent DC/DC converter structure shown by FIG. 2 instead of FIG. 1. The ANN was trained repeatedly to track different reference voltage trajectories until satisfactory tracking performance is obtained. Each training experiment starts with randomly generated network weights. Thus, each may converge to different ADP cost. The final network weights are selected from those having the lowest ADP costs. After the network is well trained, the ANN controller is used to regulate the DC/DC converter output voltage based on the error signal between the measured and reference PCC voltage. However, since the ANNs were trained independently according to FIG. 2, detailed performance evaluation of the overall integrated system of the ANN and droop control is desired, which is discussed below.

Simulation Evaluation

Figure 8:
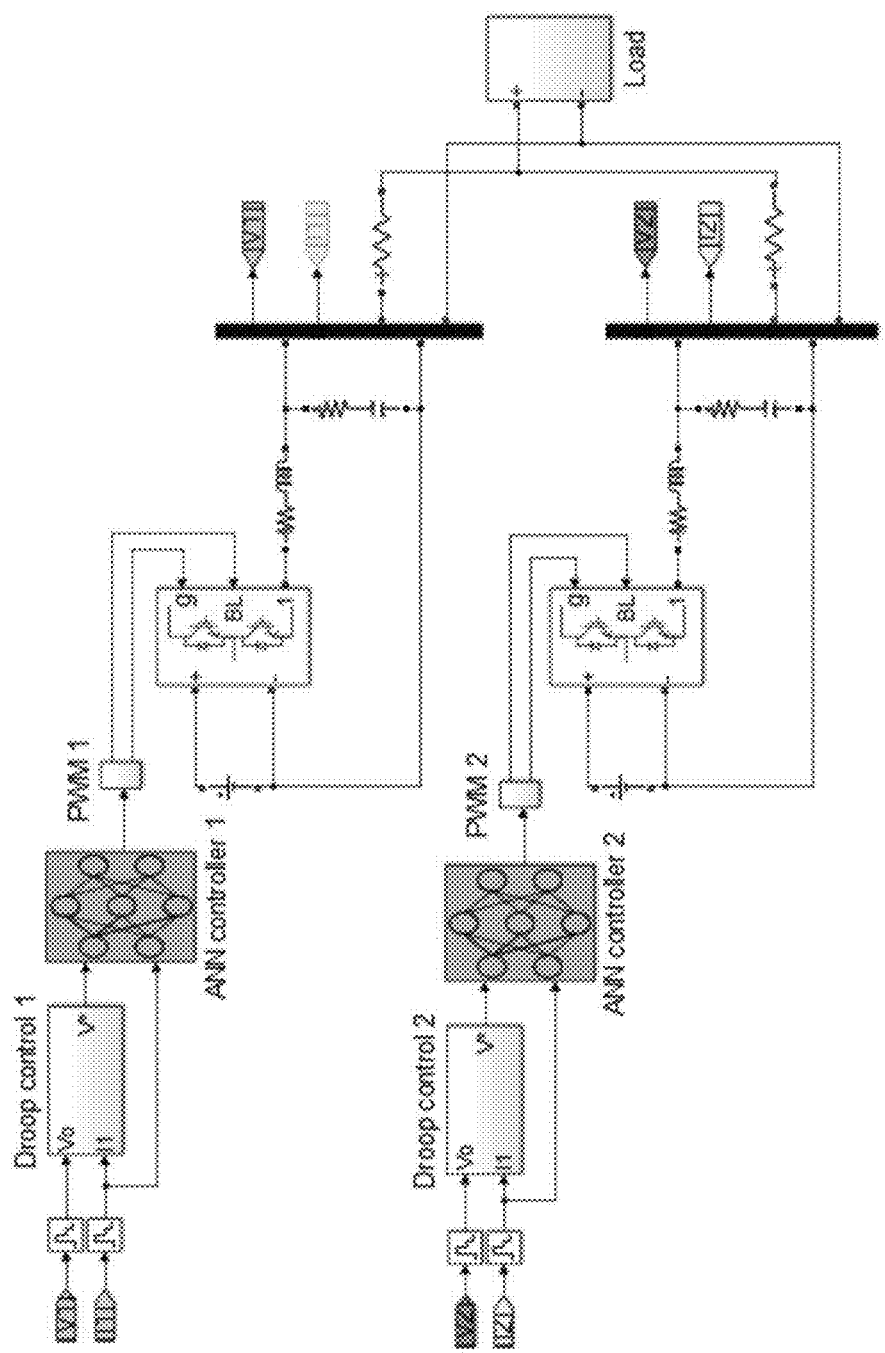
FIG. 8 illustrates a Simulink model for verifying ANN control of stand-alone DC microgrid.

The disclosed ANN control of stand-alone DC microgrid is verified using Simulink. The model is shown in FIG. 8. In the simulation, two DC/DC converters are connected in parallel with a changing load through transmission lines with the equal resistance of 0.5Ω. The parameters of the DC microgrid system are shown in Table I. The nominal output voltage is 400V, and the nominal DC input voltage is 600V.

Figure 9:
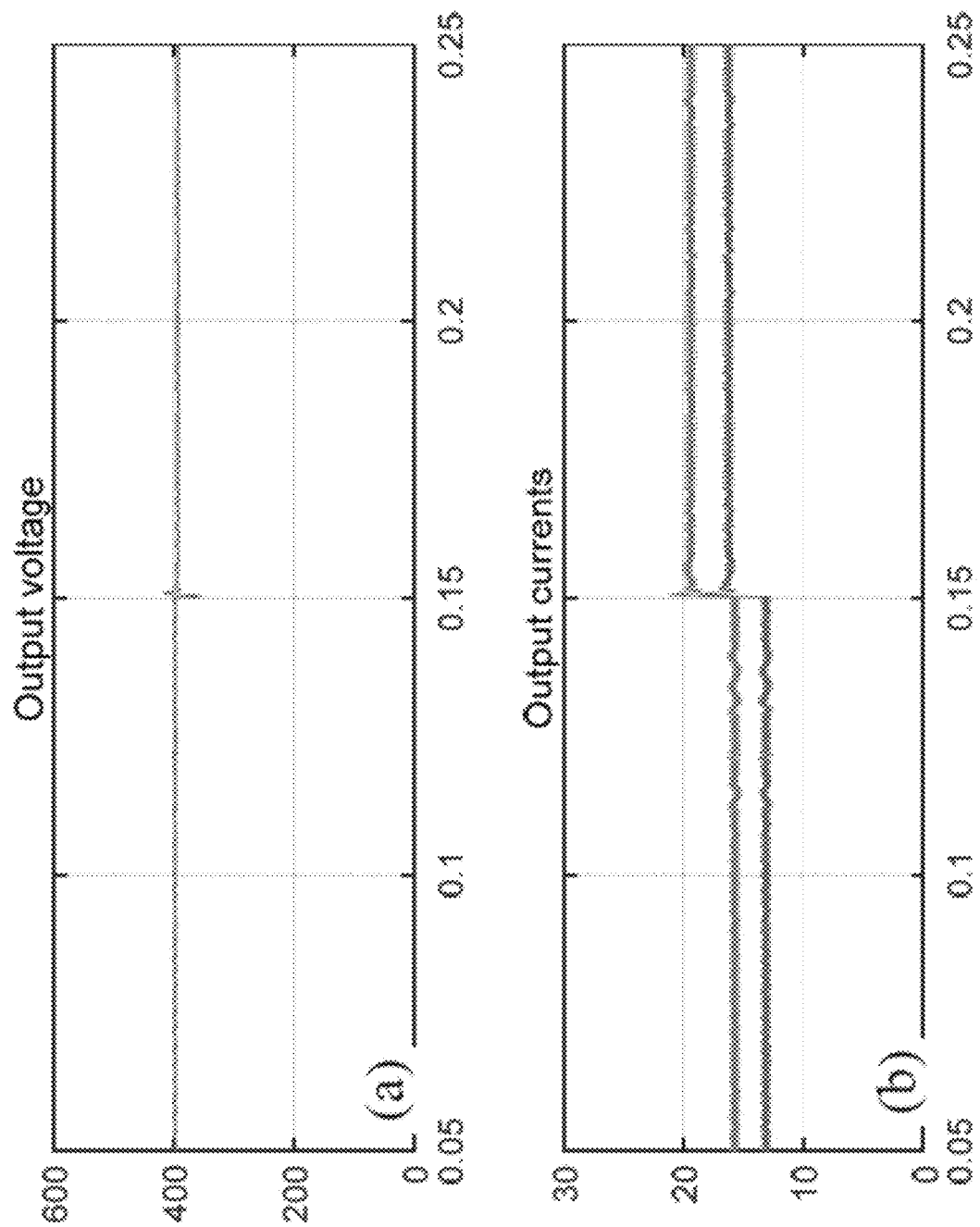
FIG. 9 illustrates Simulink simulation results where panel (a) shows output voltage and panel (b) shows output currents of the converters.
Figure 10A:
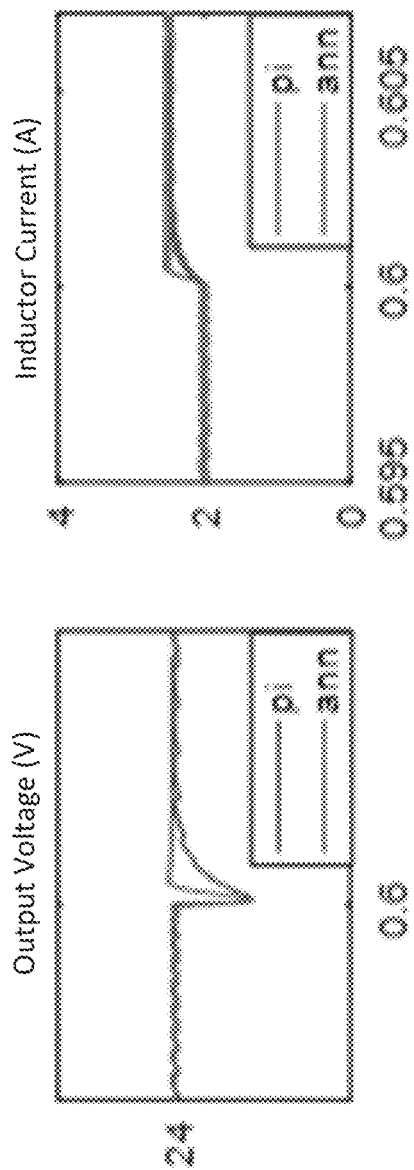
(FIG. 10A) a load change from 12 ΩV to 9.6Ω.
Figure 10B:
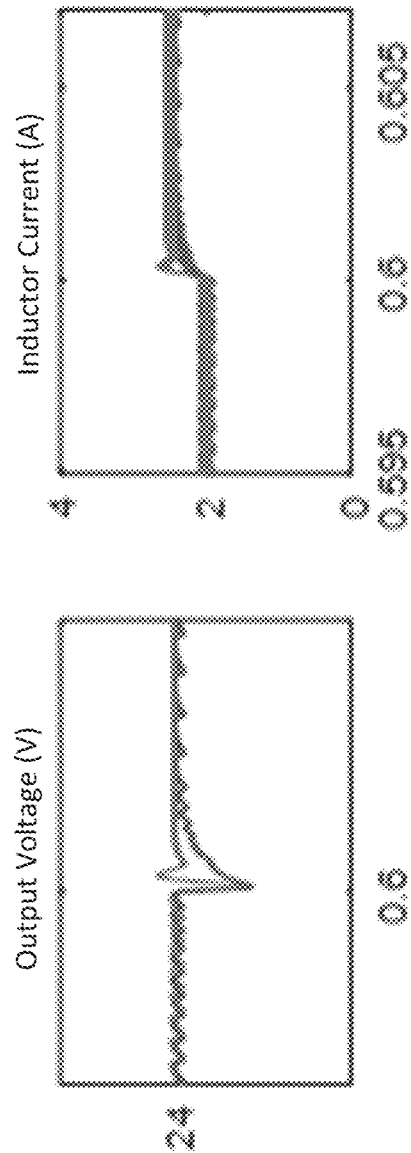
(FIG. 10B) the same load change when L increases by 50%.
Figure 10C:
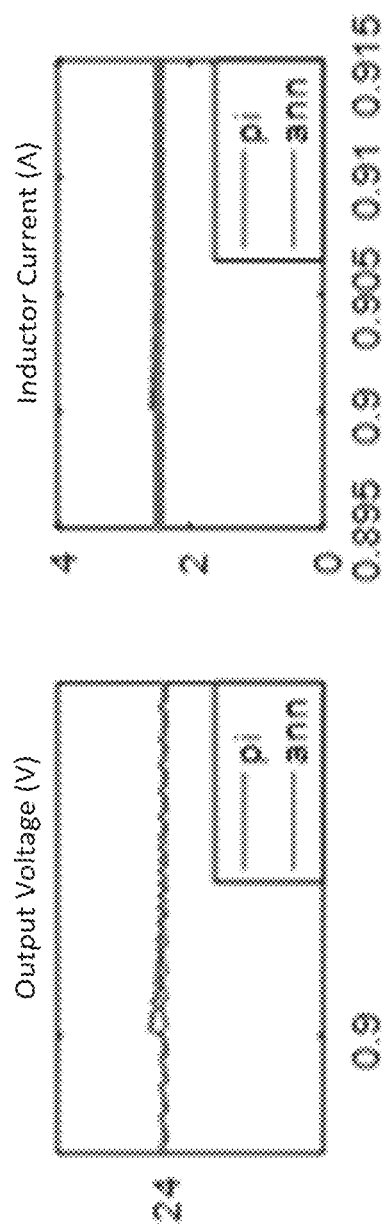
(FIG. 10C) an input voltage change from 42V to 47V.
Figure 10D:
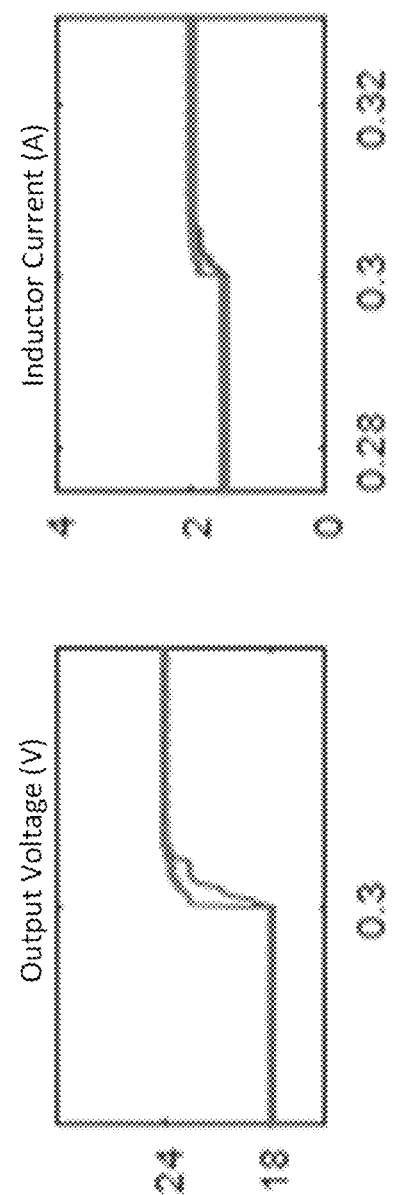
(FIG. 10D) a reference voltage change from 18V to 24V.

The virtual resistances for the two converters are 2Ω and 1.5Ω, which are determined by considering transmission line resistance and power sharing between the two converter units based on the power rating of the two units. Simulation results are shown in FIG. 9.

TABLE I

PARAMETERS OF DC MG

| Parameters | Value |
|---|---|
| Inductance L | 600 µH |
| Capacitance C | 42 µF |
| Load resistance R | 12Ω |
| Switching frequency f | 50 kHz |
| $R_{D1}/R_{D2}$ | 2Ω/1.5Ω |

FIG. 9 shows the performance of stand-alone DC microgrid with ANN and droop control. FIG. 9(a) shows the output voltage, and FIG. 9(b) shows the output currents of the two DC/DC converters. It can be seen from the figure that the output voltage of the converters at the load is maintained around the desired value during the entire simulation. Before t=0.15 sec, the load current is properly shared by the two converters according to the virtual resistance ratio of R_D2:R_D1 defined in the droop controllers. At t=0.15 sec, the load at DC bus decreases, and it causes output currents of the two DC/DC converters to increase to meet the new power demand of the loads. The figure shows that the output currents of the converters change rapidly to reach the new demanded load current using the ANN control. Again, after t=0.15 sec, the load current is properly shared according to the ratio of their droop gains. There is a slight voltage drop after 0.15 sec due to the droop control and virtual resistances. At the same time, the output currents are affected a little by the transmission line.

FIG. 10 illustrates control performance of a simulated DC/DC buck converter where PI control is compared to ANN control. The parameters of a simulated DC/DC buck converter (See FIG. 2, above) used in the evaluation are as follows: $R_L$=0.3Ω, L=5.63 mH, $R_C$=0.02Ω, and C=5 µF. Switching frequency is 10 kHz and the controller sampling time is 0.1 ms. The normal input voltage is 42V. The ANN controller was trained based on ADP and then used for both simulation and experiment evaluation. FIG. 10 compares the control of the buck converter using ANN and conventional PI control approaches. The evaluation includes output voltage stability and alteration of inductor current under a load change from 12 ΩV to 9.6Ω (FIG. 10A), the same load change when the smoothing inductor L increases by 50% (FIG. 10B), and an input voltage change from 42V to 47V (FIG. 10C). The performance for tracking reference voltage is also investigated (FIG. 10D). The study demonstrates that under all these conditions, the ANN controller has a better performance.

Figure 11A:
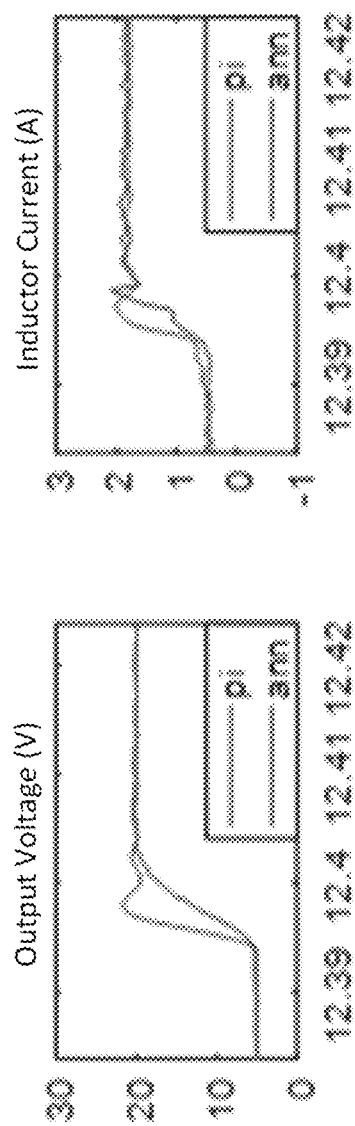
(FIG. 11A) a reference voltage change from 5V to 20V.
Figure 11B:
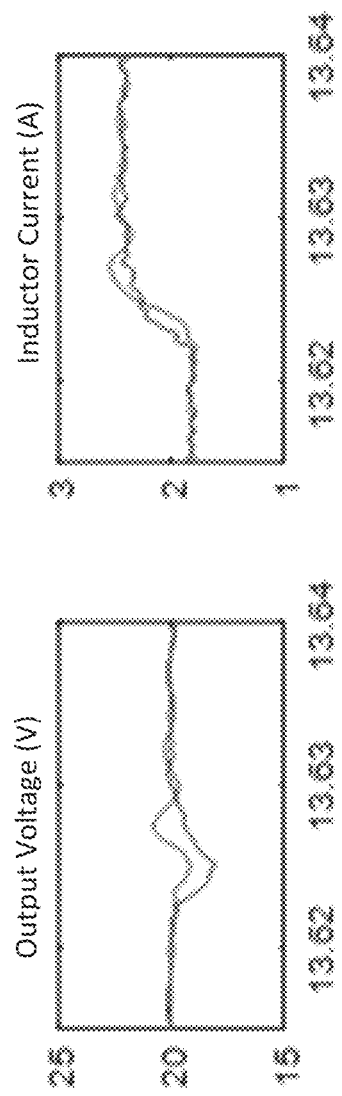
(FIG. 11B) a load change from 11Ω to 8.25Ω.

FIG. 11 shows the experiment results. Again, the ANN controller presents an excellent performance in in tracking reference voltage (FIG. 11A) and great performance in maintaining output voltage stability for variable load (FIG. 11B).

CONCLUSIONS

The operation of a standalone DC microgrid has many challenges because the voltage stability and power sharing must be handled by the DC microgrid itself. This paper presents a preliminary study on developing an ANN-based control for DC/DC converters and integrating it with droop mechanism for control of a standalone DC microgrid. Disclosed herein is an ANN-based control system and how it works with droop control to manage microgrid operation in standalone conditions.

The system performance evaluation indicates that the bus voltage can be maintained at the desired value and the output currents of the converters can be regulated rapidly when there are reference or load changes. The evaluation of the disclosed system shows that the disclosed control method has a strong ability to maintain voltage stability of a standalone DC microgrid and manage the power sharing among the parallel distributed generation units. Even in dynamic and power converter switching environments, the ANN controller shows an ability to trace rapidly changing reference commands and tolerate system disturbances.

The system has been described above as comprised of units. One skilled in the art will appreciate that this is a functional description and that the respective functions can be performed by software, hardware, or a combination of software and hardware. A unit can be software, hardware, or a combination of software and hardware. The units can comprise software for controlling an induction motor. In one exemplary aspect, the units can comprise a control system that comprises one or more computing devices that comprise a processor 1021 as illustrated in FIG. 16 and described below. As used herein, processor refers to a physical hardware device that executes encoded instructions for performing functions on inputs and creating outputs.

FIG. 12 illustrates an exemplary computer that can be used for controlling a DC/DC converter or a standalone DC microgrid. As used herein, "computer" may include a plurality of computers. The computers may include one or more hardware components such as, for example, a processor 1021, a random-access memory (RAM) module 1022, a read-only memory (ROM) module 1023, a storage 1024, a database 1025, one or more input/output (I/O) devices 1026, and an interface 1027. Alternatively, and/or additionally, the computer may include one or more software components such as, for example, a computer-readable medium including computer executable instructions for performing a method associated with the exemplary embodiments. It is contemplated that one or more of the hardware components listed above may be implemented using software. For example, storage 1024 may include a software partition associated with one or more other hardware components. It is understood that the components listed above are exemplary only and not intended to be limiting.

Processor 1021 may include one or more processors, each configured to execute instructions and process data to perform one or more functions associated with a computer for controlling a DC/DC converter or standalone DC microgrid. Processor 1021 may be communicatively coupled to RAM 1022, ROM 1023, storage 1024, database 1025, I/O devices 1026, and interface 1027. Processor 1021 may be configured to execute sequences of computer program instructions to perform various processes. The computer program instructions may be loaded into RAM 1022 for execution by processor 1021.

RAM 1022 and ROM 1023 may each include one or more devices for storing information associated with operation of processor 1021. For example, ROM 1023 may include a memory device configured to access and store information associated with the computer, including information for identifying, initializing, and monitoring the operation of one or more components and subsystems. RAM 1022 may include a memory device for storing data associated with one or more operations of processor 1021. For example, ROM 1023 may load instructions into RAM 1022 for execution by processor 1021.

Storage 1024 may include any type of mass storage device configured to store information that processor 1021 may need to perform processes consistent with the disclosed embodiments. For example, storage 1024 may include one or more magnetic and/or optical disk devices, such as hard drives, CD-ROMs, DVD-ROMs, or any other type of mass media device.

Database 1025 may include one or more software and/or hardware components that cooperate to store, organize, sort, filter, and/or arrange data used by the computer and/or processor 1021. For example, database 1025 may store data related to the control of a DC/DC converter or standalone DC microgrid. The database may also contain data and instructions associated with computer-executable instructions for controlling a DC/DC converter or standalone DC microgrid. It is contemplated that database 1025 may store additional and/or different information than that listed above.

I/O devices 1026 may include one or more components configured to communicate information with a user associated with computer. For example, I/O devices may include a console with an integrated keyboard and mouse to allow a user to maintain a database of digital images, results of the analysis of the digital images, metrics, and the like. I/O devices 1026 may also include a display including a graphical user interface (GUI) for outputting information on a monitor. I/O devices 1026 may also include peripheral devices such as, for example, a printer, a user-accessible disk drive (e.g., a USB port, a floppy, CD-ROM, or DVD-ROM drive, etc.) to allow a user to input data stored on a portable media device, a microphone, a speaker system, or any other suitable type of interface device.

Interface 1027 may include one or more components configured to transmit and receive data via a communication network, such as the Internet, a local area network, a workstation peer-to-peer network, a direct link network, a wireless network, or any other suitable communication platform. For example, interface 1027 may include one or more modulators, demodulators, multiplexers, demultiplexers, network communication devices, wireless devices, antennas, modems, and any other type of device configured to enable data communication via a communication network.

The figures illustrate the architecture, functionality, and operation of possible implementations of systems, methods and computer program products according to various implementations of the present invention. In this regard, each block of a flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The implementation was chosen and described in order to best explain the principles of the invention and the practical application, and to enable others of ordinary skill in the art to understand the invention for various implementations with various modifications as are suited to the particular use contemplated.

Any combination of one or more computer readable medium(s) may be used to implement the systems and methods described hereinabove. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object-oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described herein with reference to flowchart illustrations and/or block diagrams of methods, apparatus (systems) and computer program products according to implementations of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

Various changes and modifications to the disclosed embodiments will be apparent to those skilled in the art. Such changes and modifications, including without limitation those relating to the chemical structures, substituents, derivatives, intermediates, syntheses, compositions, formulations, or methods of use of the invention, may be made without departing from the spirit and scope thereof.

While the methods and systems have been described in connection with preferred embodiments and specific examples, it is not intended that the scope be limited to the particular embodiments set forth, as the embodiments herein are intended in all respects to be illustrative rather than restrictive.

Unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is no way intended that an order be inferred, in any respect. This holds for any possible non-express basis for interpretation, including: matters of logic with respect to arrangement of steps or operational flow;

plain meaning derived from grammatical organization or punctuation; the number or type of embodiments described in the specification.

Throughout this application, various publications may be referenced, including the references sited below. The disclosures of these publications in their entireties are hereby incorporated by reference into this application in order to more fully describe the state of the art to which the methods and systems pertain and to illustrate improvements over the present state of the art in claimed invention.

The foregoing description, for purposes of explanation, used specific nomenclature to provide a thorough understanding of the described embodiments. However, it will be apparent to one skilled in the art that the specific details are not required in order to practice the described embodiments. Thus, the foregoing descriptions of the specific embodiments described herein are presented for purposes of illustration and description. They are not intended to be exhaustive or to limit the embodiments to the precise forms disclosed. It will be apparent to one of ordinary skill in the art that many modifications and variations are possible in view of the above teachings.

What is claimed:

1. A method for controlling a DC converter or a standalone DC microgrid by:
   providing a pulse-width modulated (PWM) converter operably connected between an electrical power source and the DC converter or a standalone DC microgrid;
   providing a neural network control system operably connected to the PWM converter, the neural network control system comprising an input layer, two hidden layers, and an output layer;
   receiving at the input layer a plurality of inputs at the input layer of the neural network control system, wherein the plurality of inputs comprise an error term and an integral of the error term;
   outputting $v^*_A(k)$ by the neural network control system; and
   controlling the PWM converter using $v^*_A(k)$, wherein the neural network control system is trained to minimize a cost function of an ADP algorithm using a forward accumulation through time ("FATT") algorithm, and wherein $$v^*_A(k) = k_{PWM} \cdot A(e_{v_C}(k), s_{v_C}(k), \vec{w}),$$

where $\vec{w}$ represents the network's overall weight vector, $A(\cdot)$ denotes the whole ANN action network, and $k_{PWM}$ represents a pulse-width-modulation (PWM) gain.

2. The method of claim 1, wherein a Levenberg-Marquardt (LM) algorithm is used to train the neural network control system, and a Jacobian matrix needed by LM algorithm is calculated via the Forward Accumulation Through Time (FATT) algorithm.

3. The method of claim 1, wherein the DC converter comprises a buck DC/DC converter.

4. A system for controlling a DC converter or a standalone DC microgrid comprising:
   a pulse-width modulated (PWM) converter operably connected between an electrical power source and the DC converter or the standalone DC microgrid;
   a neural network control system operably connected to the PWM converter, the neural network control system comprising an input layer, two hidden layers, an output layer, and a processor configured to implement an approximate dynamic programming (ADP) algorithm, said neural network control system further configured to:
receive a plurality of inputs at the input layer of the neural network control system, wherein the plurality of inputs comprise an error term and an integral of the error term;
output $v^*_A(k)$ by the neural network control system; and
control the PWM converter using $v^*_A(k)$, wherein the neural network control system is trained to minimize a cost function of an ADP algorithm using a forward accumulation through time ("FATT") algorithm, and wherein $$v^*_A(k) = k_{PWM} \cdot A(e_{v_C}(k), s_{v_C}(k), \vec{w}),$$

where $\vec{w}$ represents the network's overall weight vector, $A(\bullet)$ denotes the whole ANN action network, and $k_{PWM}$ represents a pulse-width-modulation (PWM) gain.

5. The system of claim 4, wherein a Levenberg-Marquardt (LM) algorithm is used to train the neural network control system, and a Jacobian matrix needed by LM algorithm is calculated via the Forward Accumulation Through Time (FATT) algorithm.

6. The system of claim 4, wherein the DC converter comprises a buck DC/DC converter.

* * * * *